(12) United States Patent
Shinohara et al.

(10) Patent No.: US 10,518,137 B2
(45) Date of Patent: Dec. 31, 2019

(54) GOLF BALL

(71) Applicant: BRIDGESTONE SPORTS CO., LTD., Tokyo (JP)

(72) Inventors: Hirotaka Shinohara, Chichibu (JP); Takashi Ohira, Chichibu (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 16/007,227

(22) Filed: Jun. 13, 2018

(65) Prior Publication Data
US 2019/0001193 A1  Jan. 3, 2019

(30) Foreign Application Priority Data
Jun. 29, 2017  (JP) .................................. 2017-127628

(51) Int. Cl.
*A63B 37/00* (2006.01)
*C08L 75/06* (2006.01)
*C09D 175/06* (2006.01)

(52) U.S. Cl.
CPC ...... *A63B 37/0022* (2013.01); *A63B 37/0031* (2013.01); *A63B 37/0033* (2013.01); *A63B 37/0064* (2013.01); *A63B 37/0074* (2013.01); *A63B 37/0089* (2013.01); *A63B 37/0096* (2013.01); *A63B 37/0056* (2013.01); *A63B 37/0058* (2013.01); *A63B 37/0075* (2013.01); *A63B 37/0076* (2013.01); *C08L 75/06* (2013.01); *C09D 175/06* (2013.01)

(58) Field of Classification Search
CPC combination set(s) only.
See application file for complete search history.

(56) References Cited

U.S. PATENT DOCUMENTS

| 5,409,233 A | * | 4/1995 | Kennedy | ................ | A63B 37/12 |
| | | | | | 273/DIG. 8 |
| 5,744,549 A | * | 4/1998 | Lutz | ................... | A63B 37/0003 |
| | | | | | 427/393.5 |
| 6,210,295 B1 | * | 4/2001 | Yoneyama | ............. | A63B 37/12 |
| | | | | | 473/351 |

(Continued)

FOREIGN PATENT DOCUMENTS

| JP | 06-114125 A | | 4/1994 | | |
| JP | H06114125 | * | 4/1994 | ......... | A63B 37/0022 |

(Continued)

*Primary Examiner* — John E Simms, Jr.
(74) *Attorney, Agent, or Firm* — Sughrue Mion, PLLC

(57) ABSTRACT

To provide a golf ball that can prevent considerable decrease in carry distance of a driver shot when it rains and also can more reliably prevent adhesion of dirt, etc. to the surface of the golf ball. The golf ball of the present invention includes a core, a cover that is provided on an outer side of the core and has dimples, and an outermost layer that is formed on an outer side of the cover and made of a material having a contact angle of 90° or more and a dynamic contact angle of 85° or less. The golf ball may have a dynamic friction coefficient of 0.48 or less. The cover may be formed of a material having hardness of 48 or more in terms of Shore D Hardness. The outermost layer may be formed of a urethane coating containing a water repellent additive, as a main component.

11 Claims, 2 Drawing Sheets

(56) References Cited

U.S. PATENT DOCUMENTS

| | | | | |
|---|---|---|---|---|
| 6,309,706 B2 * | 10/2001 | Maruoka | ............ | A63B 37/0003 427/385.5 |
| 6,365,679 B1 * | 4/2002 | Crast | ................. | A63B 37/0003 473/351 |
| 6,398,669 B1 * | 6/2002 | Yokota | ............... | A63B 37/0003 473/378 |
| 2008/0280699 A1 * | 11/2008 | Jarvholm | ........... | A63B 37/0003 473/378 |
| 2013/0165271 A1 * | 6/2013 | Lee | .................... | A63B 37/0004 473/378 |
| 2013/0203524 A1 * | 8/2013 | Tarao | ................. | A63B 37/0023 473/378 |
| 2014/0274473 A1 * | 9/2014 | Yontz | ................. | A63B 37/0022 473/378 |

FOREIGN PATENT DOCUMENTS

| | | | | |
|---|---|---|---|---|
| JP | 2001-214131 A | 8/2001 | | |
| JP | 2001214131 | * 8/2001 | ........... | C09D 175/06 |
| JP | 2013-176530 A | 9/2013 | | |
| JP | 2014-527222 A | 10/2014 | | |

* cited by examiner

GOLF BALL

CROSS-REFERENCE TO RELATED APPLICATION

This Application claims priority from Japanese Patent Application No. 2017-127628 filed Jun. 29, 2017, which is incorporated herein by reference in its entirety.

BACKGROUND OF THE INVENTION

The present invention relates to a golf ball and more particularly to a golf ball having high water repellency.

Golf is played even when it rains. Compared to sunny conditions, under rainy conditions, the wet surface of a golf ball increases its air resistance. Thus, when a golfer hits a drive, carry distance is decreased. To deal with such a problem, JP H06-114125 A, for example, discloses that the surface of a golf ball is made of a water-repellent material having a contact angle of 90° or more such as a fluoride-based polymer or silicone resin.

Also, JP 2001-214131 A discloses that urethane resin containing organic silicone compound is used as a clear coat for the surface of a golf ball to increase the contact angle of the surface up to 90° or more in order to easily remove dirt on the surface of the golf ball.

JP 2014-527222 A discloses decreasing surface energy in a soft surface coating of a golf ball, by which friction coefficient of the surface of the golf ball is decreased.

SUMMARY OF THE INVENTION

As mentioned above, it is said that a golf ball having a hydrophobic surface, i.e., one in which contact angle of 90° or more does not cause significant reduction in, in particular, the carry distance of a driver shot when it rains, or prevents dirt or foreign material from adhering thereto. However, it is seen that a considerable amount of dirt, etc. on the surface remains even in a water repellent golf ball actually having a contact angle of 90° or more. Hence, higher performance is required to prevent adhesion of dirt, etc.

In view of the foregoing problems, an object of the present invention is to provide a golf ball that can prevent a decrease in carry distance of a driver shot when it rains and also, can more reliably prevent adhesion of dirt, etc. to the surface of the golf ball.

In order to attain the above object, a golf ball according to the present invention includes a core, a cover that is provided on an outer side of the core and has dimples, and an outermost layer that is formed on an outer side of the cover and made of a material having a contact angle of 90° or more and a dynamic contact angle of 85° or less.

The golf ball preferably has a dynamic friction coefficient of 0.48 or less. The cover is preferably formed of a material having hardness of 48 or more in terms of Shore D Hardness. A material constituting the outermost layer preferably includes a urethane coating containing a water repellent additive. The thickness of the outermost layer is preferably 8-20 μm.

According to the present invention, the outermost layer made of a material having a contact angle of 90° or more provides the golf ball surface with water repellency, and thus, can prevent a decrease in carry distance of a driver shot when it rains and can also more reliably prevent adhesion of dirt, etc. since dynamic contact angle (also referred to as sliding angle) of 85° or less makes it easy for dirt, etc. on the golf ball surface to slide off.

In addition, dynamic friction coefficient of the golf ball is suppressed to 0.48 or less, whereby a large spin rate is produced by a driver shot and the driver carry distance can be increased under sunny conditions. Also, the spin rate upon putter shot can be kept small and thus, the ball can be well rolled on the green.

MODE FOR CARRYING OUT THE INVENTION

An embodiment of the present invention is described below with reference to the accompanying drawings.

Figure 1:
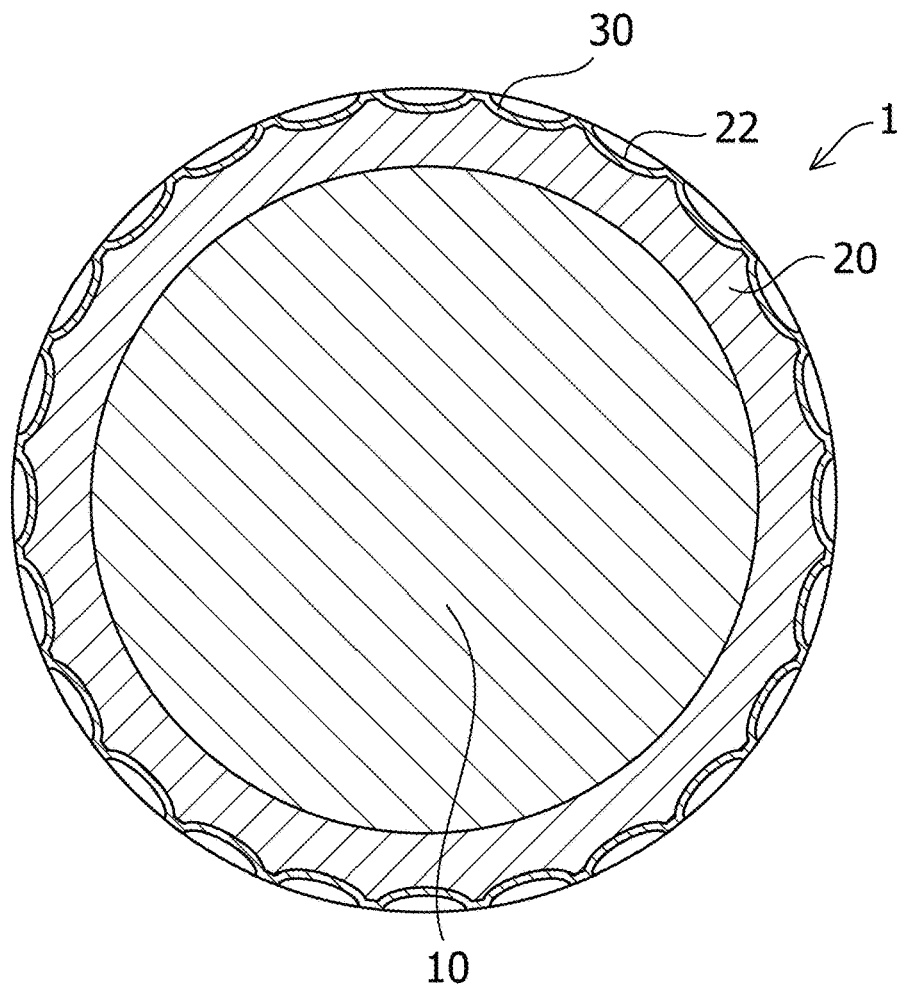
FIG. 1 is a cross-sectional view schematically showing an embodiment of the present invention.

As shown in FIG. 1, a golf ball 1 of this embodiment mainly includes a core 10 at the center of the ball, a cover 20 surrounding the outer periphery of the core 10, and an outermost layer 30 that covers the outside of the cover. The surface of the cover 20 has plural dimples 22. The outermost layer 30 covers the surface of the cover 20 along the surfaces of the dimples 22 with substantially uniform thickness. Here, this embodiment is focused on a golf ball having a two-layer structure with a core and a cover but is not limited thereto and is applicable to a golf ball having an intermediate layer between the core 10 and the cover 20, a golf ball having two or more core layers, or a golf ball with a multilayer structure having three or more layers.

The core 10 can be mainly formed of base rubber. A wide variety of rubber (thermosetting elastomer) can be used. Conceivable examples thereof include polybutadiene rubber (BR), styrene butadiene rubber (SBR), natural rubber (NR), polyisoprene rubber (IR), polyurethane rubber (PU), butyl rubber (IIR), vinyl polybutadiene rubber (VBR), ethylene propylene rubber (EPDM), nitrile rubber (NBR), and silicone rubber, although the present invention is not limited thereto. As the polybutadiene rubber (BR), for example, 1,2-polybutadiene, cis-1,4-polybutadiene, etc. can be used.

Additionally to the main component, or the base rubber, the core 10 can optionally contain additives such as a co-crosslinking agent, a crosslinking agent, a filler, an anti-aging agent, an isomerization agent, a peptizer, sulfur, and an organic sulfur compound. Also, as a main component, a thermoplastic elastomer, an ionomer resin, or a mixture thereof may be used instead of the base rubber.

The core 10 has a substantially spherical shape. The outer diameter of the core 10 is preferably about 42 mm or less, more preferably about 41 mm or less, and further preferably about 40 mm or less as the upper limit. The outer diameter of the core 10 is preferably about 5 mm or more, more preferably about 15 mm or more, and most preferably about 25 mm or more as the lower limit. The core 10 is illustrated as a solid core in FIG. 1, but it can be a hollow one. Also, the core 10 is illustrated as a single layer in FIG. 1, but it is not limited thereto, and may be formed of plural layers such as a center core and its surrounding layers.

Any known molding method is applicable to formation of a core of the golf ball. For example, the following method is conceivable: a material including base rubber is kneaded by a kneader, and then, the kneaded one is subjected to pressure vulcanization molding with a round mold to prepare a core, although this is not limited thereto. Also, any known molding method for a multilayer solid core is applicable to formation of a core with plural layers. For example, the following method is conceivable: a material for a center core is kneaded by a kneader and the kneaded one is subjected to pressure vulcanization molding with a round mold, and then, a material for a surrounding layer is kneaded by a kneader and the kneaded one is molded into a sheet and the sheet covers the center core so as to prepare a core with plural layers.

The cover 20 can be obtained by use of thermoplastic polyurethane, an ionomer resin, or a mixture thereof, although this is not limited thereto.

The thermoplastic polyurethane material is composed of a soft segment including polymer polyol (polymeric glycol) and a chain extender and polyisocyanate constituting a hard segment. According to the present invention, the polymer polyol as a raw material is preferably polyester polyol and polyether polyol although not limited thereto. Specific examples of the polyester polyol include an adipate-based polyol such as polyethylene adipate glycol, polypropylene adipate glycol, polybutadiene adipate glycol, polyhexamethylene adipate glycol and lactone-based polyol such as polycaprolactone polyol. Examples of the polyether polyol include poly(ethylene glycol), poly(propylene glycol), poly(tetramethylene glycol) and the like.

As the chain extender, although not particularly so limited, the present invention preferably adopts a low molecular weight compound having two or more active hydrogen atoms capable of reacting with isocyanate groups in the molecule and having a molecular weight of 2000 or less. Of these, aliphatic diols having 2 to 12 carbon atoms are preferred. Specific examples thereof include 1,4-butylene glycol, 1,2-ethylene glycol, 1,3-butanediol, 1,6-hexanediol, 2,2-dimethyl-1,3-propanediol. Of these, 1,4-butylene glycol is particularly preferred.

As the polyisocyanate compound, although not particularly so limited, the present invention can adopt, for example, one or two or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene 1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, and dimer acid diisocyanate. Here, it is difficult to control the crosslinking reaction during injection molding for some kinds of isocyanates. Thus, in the present invention, from the viewpoint of balance between stability during production and physical properties to be expressed, 4,4'-diphenylmethylene diisocyanate as aromatic diisocyanate is preferred.

Although not limited thereto, the ionomer resin can contain (a) component and/or (b) base resin as below, and (c) component as below can be optionally added to the base resin. The (a) component is an olefinically unsaturated carboxylic acid/unsaturated carboxylic acid ester ternary random copolymer and/or a metal salt thereof. The (b) component is an olefin/unsaturated carboxylic acid binary random copolymer and/or a metal salt thereof. The (c) component is a thermoplastic block copolymer having a polyolefin crystal block and a polyethylene/butylene random copolymer.

Additionally to the above thermoplastic polyurethane or ionomer resin, or the main component, the cover 20 can be mixed with a thermoplastic resin or elastomer other than thermoplastic polyurethane. More specifically, it is possible to use one or more selected from polyester elastomer, polyamide elastomer, an ionomer resin, styrene block elastomer, hydrogenated styrene butadiene rubber, a styrene/ethylene-butylene-ethylene block copolymer or a modified form thereof, an ethylene-ethylene/butylene-ethylene block copolymer or a modified form thereof, styrene/ethylene-butylene/styrene block copolymer or modified forms thereof, ABS resin, polyacetal, polyethylene and nylon resin. It is particularly preferred to adopt polyester elastomer, polyamide elastomer and polyacetal because of resilience, and anti-scratch characteristics, etc. are improved through reaction with an isocyanate group while maintaining high productivity. In the case of mixing the above components, the mixing amount can be appropriately selected according to the hardness adjustment of the cover material and improvements in resilience, flowability, adhesion, etc. Although not particularly limited, it can be mixed in 5 parts by mass with respect to 100 parts by mass of thermoplastic polyurethane component. Also, the upper limit of the mixing amount can be preferably 100 parts by mass or less, more preferably 75 parts by mass or less, and still more preferably 50 parts by mass or less with respect to 100 parts by mass of thermoplastic polyurethane component although not particularly limited. In addition, a polyisocyanate compound, a fatty acid or a derivative thereof, a basic inorganic metal compound, a filler, etc. can be added.

Although not limited, the thickness of the cover 20 is preferably about 0.2 mm or more, more preferably about 0.4 mm or more as the lower limit, and the thickness of the cover 20 is preferably about 4 mm or less as the upper limit, more preferably about 3 mm or less, and still more preferably about 2 mm or less. The surface of the cover 20 has plural dimples 22. The size, shape, and number of dimples 22 can be appropriately set according to desired aerodynamic property.

Although not so limited, the hardness of the cover 20 is preferably about 48 or more, more preferably about 50 or more, and still more preferably about 53 or more in terms of Shore D Hardness as the lower limit, and the hardness of the cover 20 is preferably about 70 or less, more preferably about 68 or less, and still more preferably about 65 or less in terms of Shore D Hardness as the upper limit. The hardness of the cover 20 is measured under such conditions that the resin material for the cover layer is molded into a 2 mm-thick sheet and left to stand for two weeks or more, and then, the hardness is measured according to ASTM D2240-95.

Any known molding method for a cover of a golf ball can be used for formation of the cover 20. Although not particularly limited, for example, the cover 20 is prepared by injection molding of a cover material in a mold. This mold for molding a cover has a cavity used for molding a cover and the wall surface of the cavity has plural projections for forming dimples. By arranging the core 10 at the center of the cavity, the cover 20 is formed to cover the core 10.

An optional intermediate layer (not shown) may be formed between the core 10 and the cover 20. An intermediate layer having a function of the core or having a function of the cover can be provided. Alternatively, plural intermediate layers can be formed. For example, plural intermediate layers that function as the core or cover can be formed or first and second intermediate layers that function as the core and the cover, respectively, can be formed.

Although not so limited, the outermost layer 30 can be formed using a urethane coating formed from polyol as a main agent, and polyisocyanate as a curing agent. To the main component, added as an additive is a water repellant additive so that a material constituting the outermost layer 30 can have the contact angle of 90° or more and the dynamic contact angle of 85° or less. The respective components are described below.

Although not so limited, it is preferable to use polyesterpolyol as polyol, and two types of polyesterpolyols, i.e., (A) polyesterpolyol and (B) polyesterpolyol can be used. In the case of using these two types of polyesterpolyols, they have different weight average molecular weights (Mw); the weight is preferably 20000-30000 for (A) component and 800-1500 for (B) component. The weight average molecular weight (Mw) for (A) component is more preferably 22000-29000 and still more preferably 23000-28000. The weight average molecular weight (Mw) for (B) component is more preferably 900-1200, and still more preferably 1000-1100.

The polyesterpolyol is obtained by polycondensation of polyol and polybasic acid. Conceivable examples of the polyol include diols such as ethylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylol heptane, polyethylene glycol and polypropylene glycol, triols, tetraols, and polyols having an alicyclic structure. Conceivable examples of the polybasic acid include aliphatic dicarboxylic acids such as succinic acid, adipic acid, sebacic acid, azelaic acid and dimer acid, aliphatic unsaturated dicarboxylic acids such as fumaric acid, maleic acid, icuconic acid, and citraconic acid, aromatic polyvalent carboxylic acids such as phthalic acid, isophthalic acid, terephthalic acid, trimellitic acid and pyromellitic acid, dicarboxylic acids having an alicyclic structure such as tetrahydrophthalic acid, hexahydrophthalic acid, 1,3-cyclohexanedicarboxylic acid, 1,4-cyclohexanedicarboxylic acid, and endomethylene tetrahydrophthalic acid and tris-2-carboxyethyl isocyanurate. In particular, as the polyesterpolyol for (A) component, polyesterpolyol having a cyclic structure introduced into a resin framework can be adopted. Conceivable examples thereof include polyesterpolyol obtained by polycondensation of polyol having an alicyclic structure such as cyclohexane dimethanol, and a polybasic acid, or polycondensation of polyol having an alicyclic structure and diols or polycondensation of triol and a polybasic acid. On the other hand, as the polyesterpolyol for (B) component, polyesterpolyol having a multi-branched structure can be adopted. Conceivable examples thereof include polyesterpolyol having a branched structure like "NIPPOLAN 800" available from Tosoh Corporation.

In the case of using the above polyesterpolyol, the total weight average molecular weight (Mw) of the main agent is preferably 13000-23000, more preferably 15000-22000. Also, the total number average molecular weight (Mn) of the main agent is preferably 1100-2000, more preferably 1300-1850. If these average molecular weights (Mw and Mn) are out of the above range, a wear resistance of the coating film may possibly be decreased. Note that the weight average molecular weight (Mw) and the number average molecular weight (Mn) are values (in terms of polystylene) measured by Gel permeation chromatography (hereinafter abbreviated as GPC) with a differential refractometer. In the case of using the two types of polyesterpolyols as well, the above range applies to the total weights Mw and Mn of the main agent.

Although not particularly limited, the mixing amounts of the two types of polyesterpolyol, or (A) component and (B) component, are preferably such that the mixing amount of (A) component is 20-30 mass % with respect to the total amount of main agent including a solvent and that of (B) component is 2-18 mass % with respect to the total amount of main agent.

Although not particularly limited, the polyisocyanate can be a common aromatic, aliphatic, alicyclic or other polyisocyanate. Specific examples thereof include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate, 1-isocyanato 3,3,5-trimethyl-4-isocyanatomethylcyclohexane, etc. They can be used alone or in mixture.

Conceivable examples of a modified form of the hexamethylene diisocyanate include a polyester modified form of hexamethylene diisocyanate, a urethane modified form thereof. Conceivable examples of a derivative of the hexamethylene diisocyanate include a norate form, burette form, and adduct form of hexamethylene diisocyanate (isocyanurate form).

In the urethane coating formed from polyisocyanate and polyol as a main component of the outermost layer 30, a molar ratio (NCO group/OH group) between a hydroxyl group (OH group) of polyol and an isocyanate group (NCO group) of polyisocyanate is preferably 0.6 or more, more preferably 0.65 or more as the lower limit. Also, the molar ratio is preferably 1.5 or less, more preferably, 1.0 or less, and still more preferably 0.9 or less as the upper limit. If the motor ratio is below the above lower limit, in some cases, hydroxyl groups remain unreacted, lowering performance and water repellency as a golf ball coating. On the other hand, if the ratio is above the upper limit, an excessive amount of isocyanate groups exist, urea groups (easy to separate) are produced by reaction with moisture, with the result that the performance of the golf ball coating may be lowered.

As a curing catalyst (organic metal compound) that promotes reaction between polyol and polyisocyanate, an amine-based catalyst or organic metal-based catalyst can be used. As the organic metal compound, it is possible to suitably use a metal soap such as aluminum, nickel, zinc, and tin, which is conventionally blended as a curing agent for a two-component curing type urethane coating material.

The polyol as a main agent and the polyisocyanate as a curing agent can be respectively mixed with various types of organic solvents according to coating conditions. Conceivable examples of such an organic solvent include aromatic solvents such as toluene, xylene and ethylbenzene, ester solvents such as ethyl acetate, butyl acetate, propylene glycol methyl ether acetate and propylene glycol methyl ether propionate, ketone-based solvents such as acetone, methyl ethyl ketone, methyl isobutyl ketone, cyclohexanone, ether-based solvents such as diethylene glycol dimethyl ether, diethylene glycol diethyl ether, and dipropylene glycol dimethyl ether, alicyclic hydrocarbon solvents such as cyclohexane, methylcyclohexane and ethylcyclohexane, and petroleum hydrocarbon solvents such as mineral spirits, etc.

Although not so limited, conceivable examples of a water repellent additive include silicone resin, fluorine-based polymer, silicone oil, and silicone rubber or a combination thereof. Although not so limited, conceivable examples of silicone resin include methyl hydrogen silicone oil, dimethyl silicone oil, etc. Although not so limited, conceivable examples of fluorine-based polymer include trifluoroethylene and polytetrafluoroethylene.

It is preferred to mix the water repellent additive into the main agent when in use. A mixing amount of the water repellent additive is determined such that the material constituting the outermost layer 30 can have a contact angle of 90° or more and a dynamic contact angle of 85° or less. For example, the amount is preferably 0.15 mass % or more, more preferably 0.20 mass % or more as the lower limit with respect to the total amount of main agent, and is preferably 1.90 mass % or less, more preferably 1.50 mass % or less as the upper limit.

The contact angle is preferably 95° or more, more preferably 100° or more as the lower limit. On the other hand, if the contact angle is too large, adhesion between the outermost layer and the cover is lowered and the outermost layer is likely to have difficulties in adhering to the cover or easily peel off. Thus, the upper limit thereof is preferably 160° or less, more preferably 150° or less. The contact angle is measured under such conditions that the material is applied into a 15 μm-thick resin sheet and 5 μL of water is allowed to drip on the sheet and then, the angle is measured by a contact angle meter. Note that the contact angle of a golf ball with an outermost layer can be measured. In this case, the water is allowed to drip on an edge portion of the dimple of the golf ball upon measurement, whereby the contact angle can be measured in a similar manner to the above measurement method.

Figure 3:
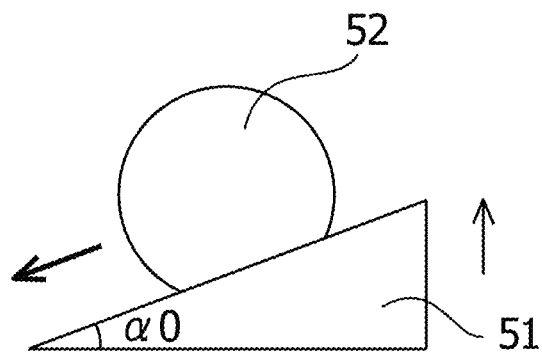
FIG. 3 is a schematic diagram illustrating dynamic contact angle of the golf ball according to the present invention.

The dynamic contact angle is preferably 80° or less, more preferably 75° or less as the upper limit and is preferably 60° or more, more preferably 65° or more as the lower limit. As will be understood from the conceptual diagram in FIG. 3, the dynamic contact angle is measured under such conditions that the material is applied into a 15 μm-thick resin sheet and 5 μL of water is allowed to drip on the sheet and then, the sheet 51 is tilted to gradually increase an inclination angle $\alpha_0$ with respect to the horizontal and the inclination angle $\alpha_0$ is measured with a droplet 52 slides down. The dynamic contact angle of a golf ball with an outermost layer can be also measured. In this case, the water is allowed to drip on an edge portion of the dimple of the golf ball and the golf ball is tilted, by which the dynamic contact angle can be measured in a similar manner to the above measurement method.

As mentioned above, although it is thought that the contact angle called a "statistic contact angle" shows that a rounder droplet with the contact angle of 90° or more has high water repellency, the findings of the inventors of the present invention reveal that this indicator cannot be used to determine the performance for removing dirt or the like with a component that greatly differs from pure water. The dynamic contact angle is also called "sliding angle", which is used to evaluate oil repellency of the pan's surface. According to the findings of the inventors of the present invention, it is revealed that the dynamic contact angle is effective as an indicator for determining the performance of removing dirt on the golf ball surface. Hence, the outermost layer 30 having satisfactory dynamic contact angle as well as contact angle is formed.

Also, the material for the outermost layer 30 can be optionally mixed with any known coating mixed component. Specifically, appropriate amounts of a thickener, an ultraviolet absorber, a fluorescent whitening agent, a slipping agent, a pigment and the like can be mixed.

Although not particularly limited, the thickness of the outermost layer 30 is preferably 8 μm or more, more preferably 10 μm or more as the lower limit, and is preferably 22 μm or less, more preferably 20 μm or less as the upper limit. Although the outermost layer 30 is illustrated as a single layer in FIG. 1, the present invention is not limited thereto, and two or more layers can be used. For example, the outermost layer may have a two-layer structure: an inner layer close to the cover and an outer layer positioned on the outer side. In this case, the following is conceivable: the inner layer is formed as a clear layer mainly containing a urethane coating with no water repellent additive, and the outer layer is formed as a water repellent layer mainly containing a urethane coating with a water repellent additive. This is especially effective for the case of using for the outermost layer a material having large contact angle (e.g., 140° or more) as mentioned above.

There is no particular limitation on a method for forming the outermost layer 30 on the surface of the cover 20, and any known method of applying a golf ball coating onto the surface of the cover can be used. In this case, an air gun coating method, an electrostatic coating method, etc. can be used.

Figure 2:
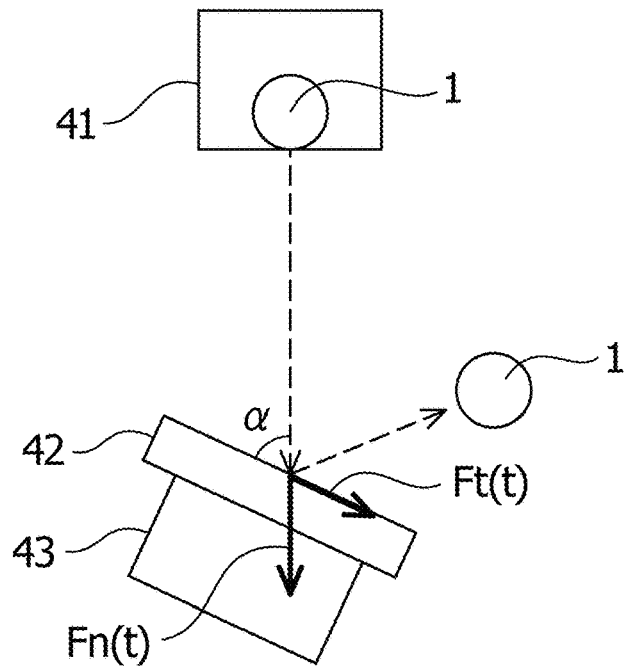
FIG. 2 is a schematic diagram showing a meter of dynamic friction coefficient of a golf ball according to the present invention.

As mentioned above, the golf ball 1 having the outermost layer 30 formed on the surface of the cover 20 preferably has the dynamic friction coefficient of 0.48 or less. As a method of measuring the dynamic friction coefficient, a device substantially the same as a contact angle tester described in JP 2013-176530 A can be used for measurement. In the present invention, as shown in FIG. 2, the golf ball 1 is allowed to fall from an 90 cm-high injection unit 41 and then to collide against a collision plate 42 disposed with an inclination angle α of 20° relative to the falling direction, and a pressure sensor 43 provided at the collision plate 42 measures the dynamic friction coefficient at that time. The angle α of the collision angle is set to 20° so as to simulate a face of an iron club that assumes an open posture upon an approach shot. The dynamic friction coefficient is calculated by:

Dynamic friction coefficient=Contact force in shear direction($Ft(t)$)/contact force in the falling direction($Fn(t)$)

The dynamic friction coefficient of the golf ball 1 is preferably 0.47 or less, more preferably 0.46 or less as the upper limit and is preferably 0.36 or more, more preferably 0.38 or more, and still more preferably 0.40 or more as the lower limit.

The diameter of the golf ball 1 is 42.67 mm (1.68 inches) or more in terms of the lower limit. As the upper limit, it is preferably 44 mm or less, more preferably 43.5 mm or less, and still more preferably 43 mm or less. The weight of the golf ball 1 is 45.93 g (1.620 oz) or less in terms of the upper limit. As the lower limit, it is preferably 44.5 g or more, more preferably 44.7 g or more, and still more preferably 45.2 g or more.

EXAMPLES

The golf balls with the structures of Table 1 were prepared and examined of the carry distance and spin performance. In Table 1, the mixing amounts of each component of the main agent and curing agent as materials for the outermost layer are represented by mass % for the main agent and the curing agent. Mixing amounts A-C of the materials for the cover in Table 1 are shown in Table 2. Note that the mixing amounts of the respective components in Table 2 are represented by parts by mass.

TABLE 1

|  |  | Example 1 | Example 2 | Example 3 | Comparative Example 1 | Comparative Example 2 | Comparative Example 3 | Example 4 | Comparative Example 4 |
|---|---|---|---|---|---|---|---|---|---|
| Main agent | Polyol | 29.77 | 28.13 | 29.77 | 27.83 | 28 | 29.61 | 28.13 | 29.61 |
|  | Additive | 0.22 | 1.46 | 0.22 | 1.95 | 0.61 | 0.23 | 1.46 | 0.23 |
|  | Type | a | a | a | c | B | c | a | b |
|  | Solvent | 70.01 | 70.41 | 70.01 | 70.22 | 71.39 | 70.16 | 70.41 | 70.16 |
| Curing agent | Isocyanate | 42 | 42 | 42 | 42 | 41.66 | 42 | 42 | 42 |
|  | Solvent | 58 | 58 | 58 | 58 | 58.34 | 58 | 58 | 58 |
|  | Contact angle | 90 | 100 | 90 | 100 | 75 | 70 | 100 | 70 |
|  | Carry distance under rainy conditions | −5.5 m | −5.0 m | −5.5 m | −5.0 m | −8.2 m | −10.2 m | −5.0 m | −10.4 m |
|  | Result | Good | Very good | Good | Very good | Poor | Bad | Very good | Bad |
|  | Dynamic contact angle | 80 | 75 | 80 | >90 | 80 | >90 | 75 | >90 |
|  | Adhesion of dirt | Good | Very good | Good | Poor | Good | Bad | Very good | Bad |
| Cover | Mixing amount | A | A | B | A | A | A | C | C |
|  | Hardness | D63 | D63 | D56 | D63 | D63 | D63 | D45 | D45 |
|  | W#1 Spin rate | 2900 | 2900 | 3100 | 2900 | 2900 | 2900 | 3300 | 3300 |
|  | Result | Very good | Very good | Good | Very good | Very good | Very good | Bad | Bad |
|  | Dynamic friction coefficient | 0.46 | 0.46 | 0.47 | 0.48 | 0.46 | 0.42 | 0.51 | 0.53 |
|  | Rolling upon putting | Good | Good | Good | Good | Good | Very good | Bad | Bad |

As the polyol as the main component in Table 1, polyester polyol synthesized by the following method was used. To a reaction apparatus equipped with a reflux condenser, a dropping funnel, a gas inlet tube and a thermometer, charged were 140 parts by mass of trimethylolpropane, 95 parts by mass of ethylene glycol, 157 parts by mass of adipic acid, and 58 parts by mass of 1,4-cyclohexanedimethanol, followed by stirring while heating up to 200-240° C. so that the resultant was heated (to react) for 5 hours. After that, polyesterpolyol having an acid value of 4, a hydroxyl value of 170, and a weight average molecular weight (Mw) of 28000 was obtained.

As the additives in Table 1, that is, the water repellent additive, a commercially available one can be used, and the types a and b indicate the silicone-based additives. In this case, the type a is a silicone-based additive that improves contamination resistance, the type b is a silicone-based additive that improves leveling property, and the type c is a fluoride-based water repellent agent where a fluoropolymer having an alkyl group chain length of 7 bonds or less was added.

As the isocyanate of the curing agent in Table 1, Duranate TPA-100 (NCO content: 23.1%, nonvolatile content: 100%) available from Asahi Kasei Corporation which is a norate form (isocyanurate form) of hexamethylene diisocyanate (HMDI)) was used.

As the solvent of the main agent, butyl acetate was used. As the solvent of the additive of the curing agent, ethyl acetate and butyl acetate were used.

The contact angle was measured with a contact angle meter (Model CA-VP, Kyowa Interface Science) by applying a mixture of the main agent and the curing agent to form a resin sheet having a thickness of 15 μm, onto which a 5 μL drop of pure water was added. After carrying out the test mentioned above, the dynamic contact angle was determined by, inclining the resin sheet to allow the water drop to slide, and then measuring the inclination angle $\alpha_0$ of the resin sheet.

TABLE 2

|  | A | B | C |
|---|---|---|---|
| T-8195 |  |  | 100 |
| Nucrel AN 4319 |  | 25 |  |
| Himilan 1605 | 50 |  |  |
| Himilan 1601 |  | 37.5 |  |
| Himilan 1557 |  | 37.5 |  |
| AM7329 | 50 |  |  |
| Titanium oxide |  | 3 | 3.5 |
| Polyethylene wax | 1 |  | 1.5 |
| Precipitated barium sulphate | 20 |  |  |
| Magnesium stearate | 1 | 1 |  |

Regarding the respective components of the cover, the mixing amounts of which are shown in Table 2, the following were used.

T-8195 is thermoplastic polyurethane elastomer, Pandex (registered trademark) manufactured by DIC Bayer Polymer.

Himilan 1557, AM 7329 is an ionomer resin of a Zn ion-neutralized ethylene-methacrylic acid copolymer manufactured by Mitsui Dupont Polychemical Co., Ltd.

Himilan 1601, 1605 is an ionomer resin of Na ion neutralized ethylene-methacrylic acid copolymer manufactured by Mitsui Dupont Polychemical Co., Ltd.

Nucrel AN 4319 is an ethylene-methacrylic acid copolymer manufactured by Mitsui Dupont Polychemical Co., Ltd.

The titanium oxide is Tipaque R-550 manufactured by Ishihara Sangyo Co., Ltd.

The polyethylene wax is commercially available from Sanyo Chemical Industries, Ltd. under the tradename of Sanwax 161P.

The precipitating barium sulfate is commercially available from Sakai Chemical Industry Co., Ltd. under the trade name of precipitated barium sulfate 100.

The mixing amounts of the core were the same in all Examples and Comparative Examples: 20 parts by weight of polybutadiene A (trade name: BR 51 manufactured by JSR Corporation) as base rubber, 80 parts by weight of polybutadiene B (trademark: BR 730 manufactured by JSR Corporation), 39.3 parts by weight of zinc acrylate (manufactured by Wako Pure Chemical Industries, Ltd.), 0.6 parts by weight of dicumyl peroxide (trade name: Percumyl D, manufactured by NOF Corporation) as an organic peroxide, 0.1 parts by weight of 2,2-methylene-bis(4-methyl-6-butyl-phenol) (trade name: Nocrac NS-6, manufactured by Ouchi Shinko Chemical Industrial Co., Ltd.) as an antioxidant, 20.4 parts by weight of zinc oxide (trade name: Tertiary zinc oxide manufactured by Sakai Chemical Industry Co., Ltd.), 1 part by weight of pentachlorothiophenol zinc salt as an organic sulfur compound (manufactured by Wako Pure Chemical Industries, Ltd.). The vulcanization was carried out under the conditions of a temperature of 155° C. for 15 minutes. The specific gravity of the core was 1.1702, and the actual specific gravity was 1.1462.

The dynamic friction coefficient was measured with the above-mentioned contact force tester shown in FIG. 2. Detailed specifications of the contact force tester will be described. The injection unit 41 was set to allow the ball to fall down from a height of 90 cm. The collision plate 42 was composed of a base plate, a surface layer plate, and a surface layer member. The base plate was made of steel with a size of 80 mm×80 mm×15 mm (thickness), the surface layer plate on the outer side thereof was made of stainless steel (SUS-630) with a size of 80 mm×80 mm×20 mm, and the surface layer member on the outer side thereof was made of titanium alloy with no groove and with an average surface roughness of Ra: 0.146 μm, the maximum height Ry: 1.132 μm, and a size of 80 mm×80 mm×10 mm. The pressure sensor 43 placed on the collision plate 42 was Kissler's three component force sensor (model 9067). A charge amplifier (not shown) was Kissler's amplifier (model 5011B).

The dynamic friction coefficient was measured in the following way.
(a) The inclination angle α of the collision plate 42 was adjusted and fixed to 20°.
(b) The golf ball 1 is allowed to fall down from the injection unit 41.
(c) The pressure sensor 43 measures the contact angle Fn(t) in the falling direction and the contact force Ft(t) in the shearing direction when the golf ball 1 collides with the collision plate 42 by use of the pressure sensor 43 to calculate the maximum value of Ft(t)/Fn(t).

The "carry distance in rainy conditions" in Table 1 indicates a value obtained by measuring the carry distance of a golf ball hit by a robot for hitting a golf ball, to which a driver (W#1) (trade name: TourStage X-Drive 415 (loft angle: 10.5°), manufactured by Bridgestone Sports) was attached, at a head speed (HS) of 45 m/s, both in rainy and sunny conditions, and then, subtracting the carry distance in the sunny condition from the distance in the rainy conditions. The value of more than −5 m was evaluated as very good, the value of from −5 m to −8 m was evaluated as good, and the value of less than −8 m was evaluated as bad. The "W#1 spin rate" indicates a spin rate (rpm) in the sunny conditions, of the golf ball measured just after being hit with an initial condition measuring device (SCIENCE EYE FIELD, available from Bridgestone Sports). The value of 3000 rpm or less was evaluated as very good, the value of 3001-3200 rpm or less was evaluated as good, and the value of above 3201 rpm was evaluated as bad. Note that the above "rainy conditions" indicates a rainfall of about 5 mm/h. Also, even in the rainy conditions, a hitting point (impact point at which the club contacts the ball) was set so as to protect the club and the ball from rain to ensure the same hitting conditions under both the sunny and rainy conditions and to measure the difference in carry distance.

Figure 4A:
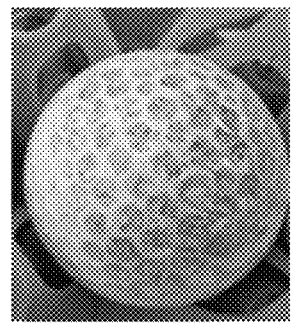
FIGS. 4A to 4C are photographs showing results of a test for checking dirt adhesion to the surface of the golf ball according to Examples of the present invention.
Figure 4B:
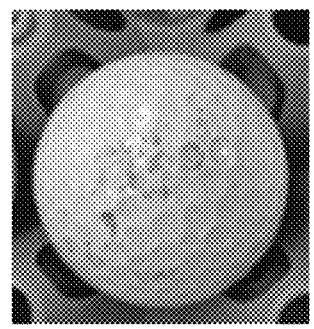
Figure 4C:
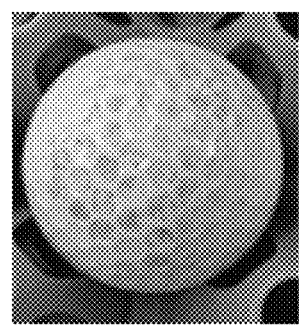

The "adhesion of dirt" in Table 1 indicates a result of visual observation as to how much dirt was left after 2 g of dirt was applied to the surface of the golf ball and the golf ball was hit under the same condition as the test for measuring the carry distance of the driver shot. If less than 20% of the applied dirt was left in terms of area, this was evaluated as very good. If less than 50% of the applied dirt was left in terms of area, this was evaluated as good. If less than 80% of the applied dirt was left in terms of area, this was evaluated as poor. If 80% or more of the applied dirt was left in terms of area, this was evaluated as bad. For reference, the photograph of FIG. 4A shows that 80% or more of the applied dirt was left in terms of area, the photograph of FIG. 4B shows that less than 20% of the applied dirt was left in terms of area, and the photograph of FIG. 4C shows that less than 80% of the applied dirt was left in terms of area.

The "rolling upon putting" indicates a value obtained by measuring the spin rate (rpm) of a golf ball just after being hit by a robot for hitting a golf ball, to which a putter (trade name: TourStage Putter TP-1, manufactured by Bridgestone Sports) was attached, at a head speed of 7 m/s, in the sunny conditions by use of an initial condition measuring device. The measuring result indicating that the spin rate was small and the ball could easily roll on the green, was highly evaluated.

As indicated by Table 1, the golf balls of Examples 1-3 and Example 4 in which the material having the contact angle of 90° or more and the dynamic contact angle of 85° or less was used for the outermost layer, were prevented from significant reduction in carry distance of the driver shot in rainy conditions and also showed high performance for removing dirt. Also, the golf balls of Examples 1-3 showed satisfactory spin rate because of a low dynamic friction coefficient of 0.48 or less and could roll well upon putter shot. In Example 4 in which the dynamic friction coefficient of the golf ball was as high as 0.51 or less, the spin rate was large and the carry distance itself of a driver was somewhat decreased in the sunny conditions, and also, the rolling performance upon putter shot was not good.

On the other hand, in Comparative Example 1 in which the contact angle was 90° or more but the dynamic contact angle was 90° or more, significant reduction in carry distance of a driver in the rainy conditions could be prevented, but satisfactory performance for removing dirt could not be obtained. In Comparative Example 2 in which the dynamic contact angle was 85° or less but the contact angle was 80° or less, a satisfactory performance for removing dirt was obtained but the carry distance of a driver shot in the rainy conditions was greatly decreased. In Comparative Examples 3 and 4 in which the contact angle was 70° and the dynamic contact angle was 90° or more, the carry distance of a driver shot in the rainy conditions was greatly decreased and also, satisfactory performance for removing dirt was not obtained.

What is claimed is:

1. A golf ball comprising a core, a cover that is provided on an outer side of the core and has dimples on a surface thereof, and an outermost layer that is formed on a whole outer side of the cover and made of a material having a contact angle of 90° or more and a dynamic contact angle of 85° or less, wherein the material comprises a water repellent additive, wherein a material constituting the outermost layer comprises a urethane coating that contains the water repellent additive, wherein the urethane coating is formed from polyol as a main agent, and polyisocyanate as a curing agent, the polyol comprising two types of polyesterpolyols having different weight average molecular weights (Mw), a first Mw being 20000 to 30000, a second Mw being 800 to 1500.

2. The golf ball according to claim 1, wherein the golf ball has a dynamic friction coefficient of 0.48 or less.

3. The golf ball according to claim 1, wherein the cover is formed of a material having hardness of 48 or more in terms of Shore D Hardness.

4. The golf ball according to claim 1, wherein the outermost layer has a thickness of 8-20 μm.

5. The golf ball according to claim 1, wherein the water repellent additive is silicone resin, silicone oil, silicone rubber or a combination thereof.

6. The golf ball according to claim 1, wherein the water repellent additive is methyl hydrogen silicone oil or dimethyl silicone oil.

7. The golf ball according to claim 1, wherein the water repellent additive is a silicone-based additive that improves contamination resistance.

8. The golf ball according to claim 1, wherein an amount of the water repellent additive is 0.15 to 1.90 mass % with respect to a total amount of a main agent of the urethane coating.

9. The golf ball according to claim 5, wherein an amount of the water repellent additive is 0.15 to 1.90 mass % with respect to a total amount of a main agent of the urethane coating.

10. The golf ball according to claim 6, wherein an amount of the water repellent additive is 0.15 to 1.90 mass % with respect to a total amount of a main agent of the urethane coating.

11. The golf ball according to claim 7, wherein an amount of the water repellent additive is 0.15 to 1.90 mass % with respect to a total amount of a main agent of the urethane coating.

* * * * *